United States Patent
Westby et al.

(10) Patent No.: US 9,394,877 B2
(45) Date of Patent: Jul. 19, 2016

(54) METHOD FOR OPERATING A BUOYANT BODY OF A WAVE POWER PLANT AND A WAVE POWER PLANT

(76) Inventors: Tov Westby, Oslo (NO); Asbjorn Skotte, Orskog (NO)

( * ) Notice: Subject to any disclaimer, the term of this patent is extended or adjusted under 35 U.S.C. 154(b) by 242 days.

(21) Appl. No.: 13/511,722

(22) PCT Filed: Nov. 24, 2010

(86) PCT No.: PCT/NO2010/000430
§ 371 (c)(1),
(2), (4) Date: Jun. 18, 2012

(87) PCT Pub. No.: WO2011/065838
PCT Pub. Date: Jun. 3, 2011

(65) Prior Publication Data
US 2012/0285544 A1    Nov. 15, 2012

(30) Foreign Application Priority Data

Nov. 24, 2009 (NO) .................................. 20093401

(51) Int. Cl.
*F03B 13/18* (2006.01)
*F03B 17/02* (2006.01)
(Continued)

(52) U.S. Cl.
CPC ............. *F03B 13/1885* (2013.01); *F03B 13/16* (2013.01); *F03B 13/182* (2013.01); *F03B 13/1845* (2013.01); *F03B 13/1865* (2013.01); *F03B 13/1875* (2013.01);
(Continued)

(58) Field of Classification Search
CPC .................. Y02E 10/38; F03B 13/16–13/182; F03B 13/1845; F03B 13/1865–13/1875; F03B 13/20; F03B 13/26–13/262; F03B 13/266; F03B 13/1885; F03B 13/1895; F03B 13/189; F03B 17/02; F03B 17/025; F03G 3/00; E02B 9/08
USPC .......................... 60/498, 398; 290/42, 43, 53; 417/330–333, 337; 405/75, 76
See application file for complete search history.

(56) References Cited

U.S. PATENT DOCUMENTS 4,742,241 A     5/1988  Melvin
4,763,126 A *   8/1988  Jawetz ........................... 340/985
(Continued)

FOREIGN PATENT DOCUMENTS

DE     34 19 565     11/1985
SE     524 400       8/2004
(Continued)

*Primary Examiner* — Kenneth Bomberg
*Assistant Examiner* — Wesley Harris
(74) *Attorney, Agent, or Firm* — Ladas & Parry LLP

(57) ABSTRACT

Method for maneuvering a buoyant body of a wave power converter having a mechanical-electric, mechanical-hydraulic or piezo-electric energy converter which is arranged in the sea under the buoyant body, the buoyant body and wave power converter being connected by a wire, and which buoyant body is provided with at least one ballast tank for controlling the buoyancy of the buoyant body, where the method includes, by means of measuring equipment acquiring information regarding wire tension, filling level/pressure in the ballast tank and stroke of the energy converter, and controlling the buoyancy of the buoyant body by supplying/discharging water/air to/from the ballast tank while at the same time adjusting the tension of the wire by operating a winch arranged in the buoyant body. The invention also relates to a wave power plant for executing the method.

7 Claims, 5 Drawing Sheets

(51) Int. Cl.
*F03B 13/26* (2006.01)
*F03B 13/16* (2006.01)
*F03B 13/20* (2006.01)
*F03G 3/00* (2006.01)

(52) U.S. Cl.
CPC ............ *F03B 13/1895* (2013.01); *F03B 13/20* (2013.01); *F03B 13/26* (2013.01); *F03B 13/262* (2013.01); *F03B 13/266* (2013.01); *F03B 17/02* (2013.01); *F03B 17/025* (2013.01); *F03G 3/00* (2013.01); *Y02E 10/38* (2013.01); *Y10T 137/0318* (2015.04)

(56) References Cited

U.S. PATENT DOCUMENTS

| | | | |
|---|---|---|---|
| 5,808,368 | A | 9/1998 | Brown |
| 6,091,161 | A * | 7/2000 | Dehlsen et al. ................ 290/43 |
| 6,617,705 | B1 * | 9/2003 | Smalser et al. ................ 290/42 |
| 6,731,018 | B1 | 5/2004 | Grinsted et al. |
| 6,756,695 | B2 | 6/2004 | Hibbs et al. |
| 7,444,811 | B2 | 11/2008 | Skotte et al. |
| 7,474,013 | B2 * | 1/2009 | Greenspan et al. ............. 290/53 |
| 7,525,214 | B2 | 4/2009 | Atilano Medina et al. |
| 7,585,131 | B2 | 9/2009 | Oigarden et al. |
| 2007/0164568 | A1 | 7/2007 | Greenspan et al. |
| 2007/0231072 | A1 * | 10/2007 | Jennings et al. ................ 405/75 |
| 2009/0212562 | A1 | 8/2009 | Jaugilas |
| 2010/0133843 | A1 | 6/2010 | Nair |
| 2010/0270797 | A1 | 10/2010 | Stansby et al. |

FOREIGN PATENT DOCUMENTS

| WO | WO 2009/146564 | 12/2009 |
|---|---|---|
| WO | WO 2010/067341 | 6/2010 |

* cited by examiner

METHOD FOR OPERATING A BUOYANT BODY OF A WAVE POWER PLANT AND A WAVE POWER PLANT

This application is a 371 of PCT/NO2010/000430, filed on Nov. 24, 2010, which claims priority to Norwegian patent application number 20093401, filed Nov. 24, 2009, which is incorporated herein by reference.

The present invention relates to a method for operating a buoyant body of a wave power converter in a wave power plant. More particularly the method relates maneuvering the buoyant body in relation to a mechanical-electric, mechanical-hydraulic, or piezo-electric energy converter to ensure an efficiency degree as high as possible, as well as safeguarding the buoyant body during storms.

Furthermore it comprises a wave power plant including one or more such wave power converters.

By "wave power converter" as used herein is understood the mechanical system of buoyant body, elements for power transmission to a mechanical-electric converter (generator), mechanical-electric converter (pump) or a piezo-electric tension-wire and anchoring to the seafloor.

By "wave power plant" as used herein is understood a wave power converter with accompanying control equipment, storm protection and equipment for connection to a power grid.

BACKGROUND

Different wave power converters have been developed having individual buoys which by means of their elevation during wave movements transfer power to a generator, a hydraulic pump system or another mechanical energy converter. Wave power converters with accompanying control system form a unit which is arranged in sea areas having as even waves as possible.

Such wave power converters have the advantage over raft systems that they are easier to make storm resistant. Still, such buoyant bodies with accompanying parts are vulnerable to breakdown during storms. This has lead to increased dimensions of mechanical elements with accompanying high costs. In reality it has not yet been possible to build wave power plants with acceptable lifetime and acceptable energy costs based on such wave power converter, due to the need for large dimensions in order to withstand extreme weather, which only is present during a few percentage of the normal operating time.

In addition it is difficult to achieve an optimal buoyant level for the buoyant bodies during operation, mainly due to wave influences, but also due to other water currents and wind. This has also negatively influenced the operating economy.

In Norwegian patent No. 321 085 (Ocean Energy) is described the use of ballast tanks to immerse rafts of buoyant bodies during storm. This has not provided a sufficient storm protection, mainly due to the costs and inconvenience in use.

From U.S. Pat. No. 4,742,241 (Melvin) it is known to pull a raft with wave converters by means of winches. Neither this publication has made a basis for constructing a sufficient wave power plant.

U.S. Pat. No. 7,683,500 describes a device and a method for wave energy conversion. In one embodiment of the device a buoy, a shaft and an electric generator is described. The shaft is connected to the buoy in such a manner that when the buoy moves vertically in response to a passing wave, the shaft is rotated. The shaft is connected to the generator such that the shaft rotation generates electric power. A solution like this has large disadvantages, a.o. it is costly to implement, it requires a substantial and costly maintenance and the lifetime will be rather limited due to the lifetime of the shaft and bearings, which is a well known problem in relation with maritime environments and therefore seeks to be avoided to the extent possible. From WO 2009056854 is known a device for wave conversion based on vertical movement of a buoy. Vertical movement of the buoy is controlled by letting water in through an upper surface of the buoy. The upper surface of the buoy is used to generate hydrodynamic forces that act downwards against upwardly directed forces on a lower surface of the buoy and thereby effectively dampen its movement in case of the presence of a wave which would normally cause undesired large vertical movements of the buoy. The Movement of water on the upper surface can be controlled by adjusting the depth of the float.

Both U.S. Pat. No. 7,683,500 and WO 2009056854 teach that the buoy can be immersed under the sea surface during storm or the like, but they fail in that they can take in water as ballast but cannot get rid of the water and will therefore remain under water if they take in enough water to remove its buoyancy.

In recent years other types of devices for conversion of wave power to be arranged on the seafloor have been developed. Linear generators, hydraulic pumps and recently NASA a.o. have launched a piezo-electric "tension-wire" that can produce energy directly when tensioned.

These are smart solutions in the sense that they avoid the tough weather conditions at the surface and most of these are patented in different variants. Nothing is done, however, with respect to the buoyant body that shall float on the surface, in relation to the extreme weather conditions they may be subjected to. As mentioned above it is described, a.o. in U.S. Pat. No. 7,683,500 and WO 2009056854, that the buoy may be immersed in the water during storm, but as mentioned these are burdened with disadvantages and are not provided with any automatic solution to handle this.

Furthermore none of the known solutions has automatic adjustment means for tide (ebb and flow), currents and constant changes in the wave pattern at the surface for optimal and economically defensible operation of such plants over time.

Furthermore, all the known solutions describe use of rotary movement to recover energy from a buoy which exhibits a mainly linear movement in a vertical direction. As mentioned above the utilization of rotary movement will involve significant use of bearings which will reduce the lifetime and which will increase the installation costs and maintenance costs.

Common features for the known technologies are that they do not satisfy the requirements to production cost, operation, lifetime, degree of efficiency and probability of survival and that they therefore do not offer an economically defensible solution.

In addition the known solutions include a winch arranged at the seafloor which is unfavorable since it is a moist environment, larger reels are required to handle the wire, there are strict requirements to the encapsulation due to the high pressure and there are strict requirements to the bearings due to the moist environment, etc.

Object

The main object of the present invention is to improve the wave power technology so that it becomes economically competitive with respect to operational reliability as well as operating economy, hereunder to provide solutions for the mentioned problems of prior art.

More specifically it is an object to provide a wave power technology which is more weather resistant and more resistant to storm and other mechanical strains.

A parallel object is to provide a wave power plant, in which the level of the individual buoy bodies or buoys is better adapted to the mechanical conversion system than with known wave power plants.

It is also an object to provide a wave power technology which allows optimization of the position of the buoyant bodies in the waves.

The present invention also seeks to improve the connection to different energy converters, for instance generators, available, so that a stable and economically defensible concept for wave power production can be obtained with the ability to survive extreme weather and which exhibits high power efficiency during all conditions and minimal down time during the entire operation period.

Finally it is an object of the present invention to provide a wave power technology where consideration is taken to the immersion of the buoyant body, as well as the stroke of the energy converter in order to achieve optimal utilization of the wave energy at any time.

The Invention

A method in accordance with the present invention is defined by the claims. Preferred features of the invention are disclosed by the claims.

A wave power plant in accordance with the present invention is defined by the claims. Preferred features of the wave power plant are disclosed by the claims.

The basis for the invention is a method for maneuvering a buoyant body (buoy) for a wave power converter where the wave power converter includes an energy converter unit including a mechanical-electric, mechanical-hydraulic or piezo-electric energy converter which is arranged under the buoyant body in the sea, where the buoyant body and the energy converter being connected by means of a wire connection.

The buoyant body is provided with a winch for controlling of the wire tension and provided with at least one ballast tank for controlling the amount of ballast.

The substantial novel features of the present method consist in, by means of measuring equipment, acquiring information regarding one or more of the following:
movement measurement,
wire tension,
filling level/pressure in ballast tank(s),
stroke of the energy converter,
wave height,
wave frequency,
wind,
precipitation,
temperature
and the like.

Thereafter the acquired information is used to control the weight of the buoyant body by supplying/discharging water/air to/from the ballast tank(s) while simultaneously adjusting the wire tension by operating a winch arranged in the buoyant body for thereby lower or raise the buoyant body without removing the wire tension, while maintaining optimal strokes for the energy converter in relation to movements of the buoyant body caused by wave movements.

It is inherent in this that the winch and the ballast tank(s) are operated to control the immersion of the buoyant body and wire tension in order to obtain a favorable power transmission to the energy converter for converting the wire tension to another energy form, particularly electrical by use of linear generator, with vertical movements of a limited stroke.

Due to the limited stroke it is important that the buoyant body is positioned and the wire tension adjusted to provide optimal strokes in relation to the wave movement at the sea surface. If the winch does not adjust the wire in relation to the wire tension and the stroke of the energy converter, it will e.g. result in that the linear generator only works in an upper or a lower layer and does not utilize its entire stroke, which will give much lower power efficiency.

Consequently one must, to use the energy in the waves optimally, control the buoyant body so that the linear generator operates within its entire stroke as often as possible. In order to achieve this, the buoyant body and the energy converter must communicate so that the buoyant body can adjust the wire length optimally by means of the winch.

This method can be exploited most optimally by activating the winch in order to pull the buoyant body under the level for critical wave movement in combination with allowing the system to reduce the buoyancy of the buoyant body by supplying water into the ballast tank(s) to prevent overloading the wire.

The invention furthermore includes a wave power plant having a buoyant body which is connected to a mechanical-electric, mechanical-hydraulic or piezo-electric energy converter in the sea or on the seafloor under the buoyant body by means of a wire, and where the buoyant body is provided with at least one ballast tank for controlling the immersion of the buoyant body, and provided with a winch for operating the wire. In marine solutions like this it is important that the energy converter has few movable and exposed parts. It is also particularly favorable that the winch for the wire is arranged in the buoyant body since this is a rather dry environment compared to being arranged at the energy converter, which is the case for prior art. This also simplifies the maintenance by having the winch easily accessible while also the requirements to the bearings are significantly reduced since they are not exposed to pressure in the same manner as for the known designs.

The buoyant body is furthermore provided with one or more valves for discharge and supply of water/air to the ballast tank(s). For supply of air to give the buoyant body buoyancy, the buoyant body includes at least one compressor which is connected to the ballast tank(s).

Furthermore the wave power plant includes communication means that are arranged to, in connection with the buoyant body and in connection with the energy converter in the sea or on the seafloor, to communicate information regarding the stroke of the energy converter up to the buoyant body.

For operation of the wave power plant it includes a control unit arranged in the buoyant body, said control unit being arranged to perform the controlling of the buoyant body by controlling the winch and the ballast tank(s) based on the stroke of the energy converter and the wire tension, as well as possible information regarding one or more of the following:
movement measurement,
filling level/pressure in the ballast tank(s),
wave height,
wave frequency,
wind,
precipitation,
temperature,
and the like.

Basically, the buoyant body is to be controlled in a manner so that it always has buoyancy, but when needed, the buoyant body may be immersed as far under water as desired. Since the buoyant body under normal conditions will have some remaining buoyancy, the wire down to the energy converter will always have a tension.

Furthermore the wave power plant includes measuring means for acquiring the information mentioned above.

For operation of the buoyant body the buoyant body includes an energy source, preferably in the form of batteries and solar cells and/or mini wave generators arranged in connection with the buoyant body or by a separate cable down to the energy converter at the bottom. Use of mini windmills is also contemplated for this purpose as are also other suitable solutions, such as a mini-generator connected to the winch motor.

The ballast tank(s) are preferably integrated in the buoyant body, preferably in the lower part thereof.

The buoyant body furthermore includes a unidirectional air valve being arranged on top of and at the side of the ballast tank(s) to prevent overpressure in the ballast tank(s) when they are to be filled in surface position.

The wave power plant is also, as mentioned, provided with communication means with the buoyant body and the energy converter unit, for communication of measured values to an internal and/or external control system, preferably by underwater acoustic communication (UAC).

This gives possibilities for three different control functions for the buoyant body:
 adaption of the immersion of the buoyant body to wave level and wave frequency to provide optimal wave energy recovery,
 adaptation of wire length for optimal operation of the mechanical-electric or mechanical-hydraulic energy converter,
 complete immersion of the buoyant body during extreme weather.

By adaptation of the immersion of the buoyant body to wave level and wave frequency is implied that the buoyant body is provided with optimal ballast to follow the waves in an optimal manner.

By adaptation of wire length for optimal operation of the energy converter is implied that the wire length is adapted in relation to the stroke of the energy converter so that optimal power efficiency is achieved at different wave heights and wave frequencies.

By complete immersion of the buoyant body during extreme weather is implied that the buoyant body manually through command from a control system or automatically is arranged to dive when the wave height exceeds a predetermined limit or other meteorological information indicates that unfavorable conditions that may cause buoyant body breakdown will occur.

These functions will be described in further detail in connection with an exemplary embodiment.

Additional preferable features and details of the present invention will be disclosed by the following exemplary description.

EXAMPLE

The invention is below described in further detail with reference to the accompanying drawings, where:

Figure 1:
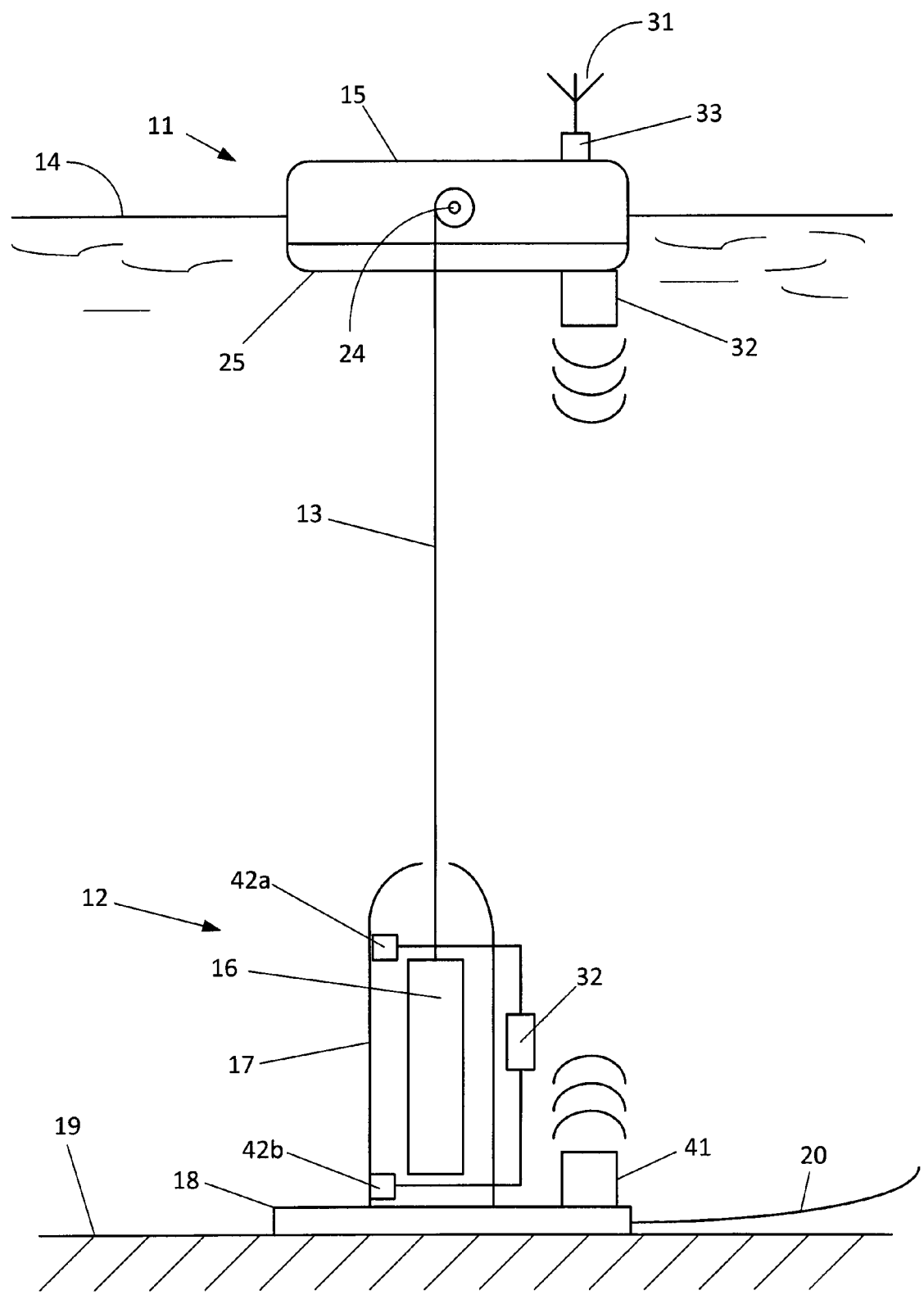
FIG. 1 is a schematic side sectional view of a wave power converter according to the present invention.

It is firstly referred to FIG. 1 which shows schematically a sectional view of a wave power converter in accordance with the invention. A wave power converter in accordance with the invention includes three main components, namely a buoyant body 11, an energy converter unit 12 and a wire 13 extending between the buoyant body 11 and the energy converter unit 12.

Figure 2:
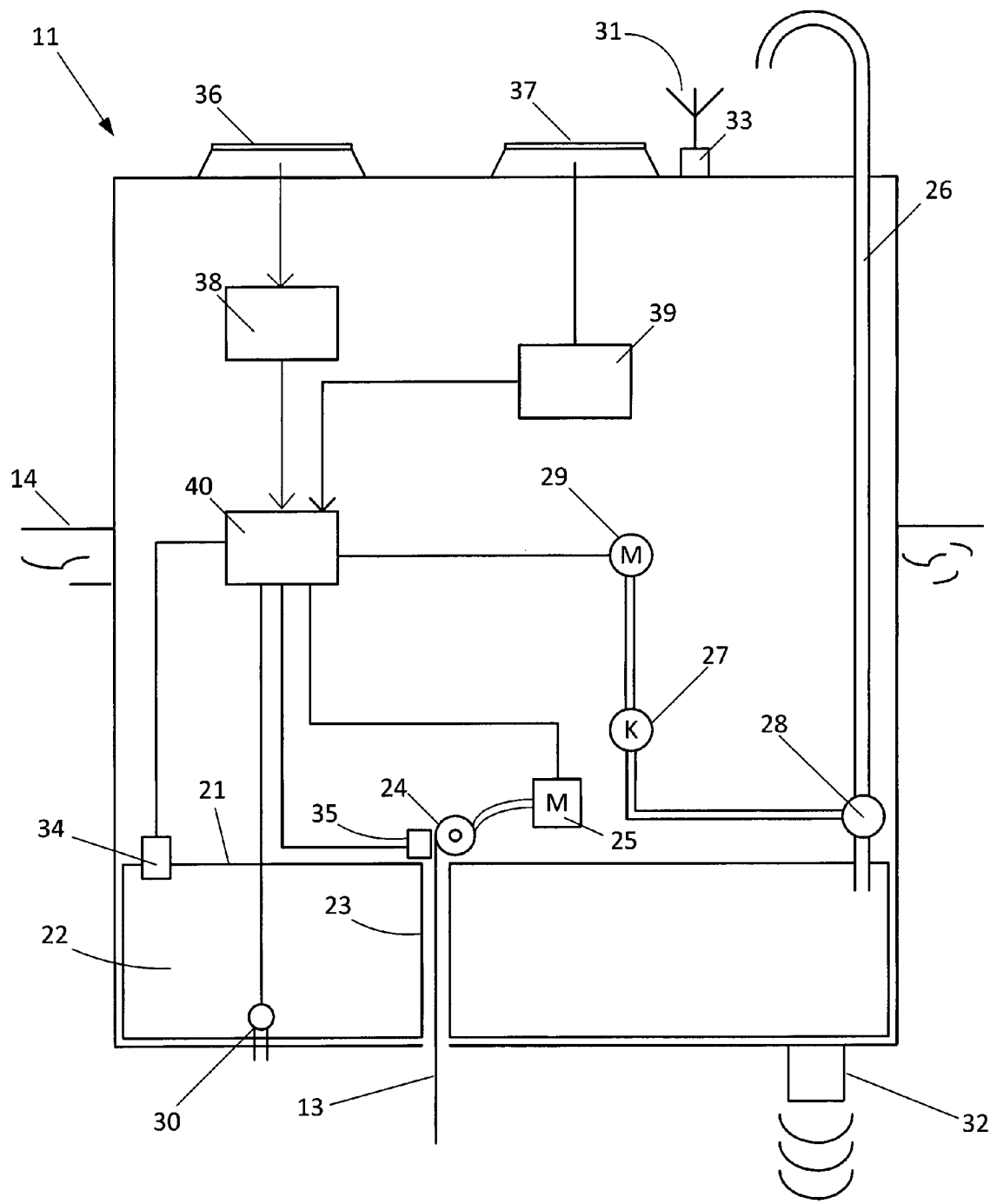
FIG. 2 is a schematic side sectional view of a buoyant body for use with the wave power converter of FIG. 1.

The buoyant body 11 is placed in a sea area 14 in which stable high wave movements are expected without regularly occurring extreme weather. The buoyant body 11 includes a buoy-shaped body 15 which is mainly filled with air, but which may also contain foam material. Further details of the buoyant body 11 are shown in FIG. 2 and described with reference to same.

By means of the wire 13 extending from the buoyant body 11 down to the energy converter unit 12, the wave power converter is arranged for conversion of a tensile force caused by the elevation movement of the buoyant body 11 in vertical direction to an electric effect.

The energy converter unit 12 includes an energy converter, preferably in the form of a linear generator 16 arranged in a housing 17 placed on a socket 18 at the seafloor 19. The housing 17 and the linear generator 16 have a weight and optionally an anchoring that ensures that the energy converter unit 12 remains stable in its position on the seafloor 19.

As an alternative to the linear generator 16 a rotary generator, a hydraulic pump or a piezo-electric generator may be used. In any case the output from the energy converter unit 12 is prepared for being interconnected from a large number of identical or similar wave power converters. For this purpose a cable 20 which is part of an interconnecting network with connection to a shore based or offshore based consumer network is used. This interconnecting network can by use of the linear generator 16, as shown in the example, in a known manner include transforming equipment for adaptation of voltage and frequency to the receiving network.

FIG. 2 shows schematically a sectional side view of the buoyant body 11, as shown in FIG. 1. FIG. 2 shows a buoyant body 11 which is positioned in the sea 14 and by wave movements is moving up and down in relation to an energy converter unit 12. Due to the buoyant body 11 being connected to the energy converter unit 12 by the wire 13, the vertical movement of the buoyant body 11 will affect the generator 16 in FIG. 1 with a force corresponding to the lifting force.

The buoyant body 11 has an internal bulkhead or double-wall bottom 21 which limits a ballast tank 22 for receiving water. The ballast tank 22 is provided with a central pipe shaped channel 23 for the wire 13 to a winch 24 being arranged on the double-wall bottom 21. The winch 24 is powered or decelerated by a tensioning motor 25.

The ballast tank 22 is connected to a vertical ventilation pipe 26 which inside the buoyant body 11 is connected to a compressor 27 via a valve 28, said compressor 27 being powered by a motor 29.

Furthermore the buoyant body 11 includes at least one bottom valve 30 for discharging water from the ballast tank 22.

Furthermore the buoyant body 11 is provided with communication means 31, such as an antenna, for receiving and sending signals from/to an external network. This is described more in details below.

Furthermore both the buoyant body 11 and the energy converter unit 12 are provided with communication means 32, such as an UAC transducer, for communication there between.

The buoyant body 11 is also provided with measuring means 33, which by example can be arranged in connection with the antenna 31, for measuring movement, measuring wind, possibly measuring precipitation (rain) and temperature. If the measuring means 33 are just for measuring movement, they can be arranged inside the buoyant body 11.

Furthermore the buoyant body 11 is provided with measuring means 34 connected to the ballast tank 22 to measure the water level/pressure in the ballast tank 22, e.g. in the form of a laser meter, a float or similarly suitable measuring instruments.

Furthermore the buoyant body 11 is provided with means 35 for measuring the wire tension in the wire 13 in connection with winch 24, such as a wire tension meter, "KP-meter", or the like for continuous monitoring of tensional of the wire 13.

The buoyant body 11 is furthermore provided with energy supply means, such as a solar cell plant including at least one solar cell panel 36, 37 arranged on top of the buoyant body 11, and at least one battery 38, 39. In this way the buoyant body 11 can also be operated when there is no sunshine and when it is completely immersed, as further described below. Preferably the solar cell plant includes two batteries 38, 39 so that one battery can serve as a backup.

The buoyant body 11 can also be provided with power from the energy converter unit 12, provided that a cable is connected between the energy converter unit 12 and the buoyant body 11. Preferably such a cable is arranged in connection with the wire 13.

Furthermore the buoyant body 11 includes a control unit 40 which is provided with means and/or software for controlling the buoyant body 11. The control unit 40 is arranged to acquire information regarding water level/pressure in the ballast tank 22, wire tension, movement measurement, wind measurement and optionally precipitation and temperature measurement, information of wave height and wave frequency as well as the stroke of the energy converter unit 12. Preferably the control unit 40 also is arranged to monitor the state of the energy supply, i.e. to verify if the solar cell plant is well functioning, the battery condition, etc.

The control unit 40 is thus arranged to controlling the winch 24 via the motor 25, bottom valves 30, the compressor 27 via its motor 29, and the valve 28.

Again it is referred to FIG. 1. At the seafloor, by the energy converter unit 12 or at least a number of energy converter units 12, a surface meter 41 based on acoustic signals ("acoustic surface tracer") is arranged. It can monitor the wave level in the area around the buoyant body 11 and register the position of the buoyant body 11 in the waves. This can take place by means of known technology, such as "underwater acoustic communication".

The surface meter 41 transmits signals to the buoyant body 11 via the UAC transducer 32. It can also transmit the measured value, either continuously or at regular intervals, by wireless transmission to a shore based control central. Alternatively, a signal cable can be used to the shore based control central. A signal cable can also be arranged for transmitting values between the buoyant body 11 and the energy converter unit 12.

Furthermore the energy converter unit 12 is provided with means 42*a-b* to monitor the strokes of the linear generator 16, e.g. in the form of a pair of end position sensors, said means being connected to the communication means 32 for communication of measured information up to the buoyant body 11. This information will provide the basis for operation of the winch 24 and the ballast tank 22 to ensure optimal utilization of the wave movement with respect to the stroke of the linear generator 16.

When using a rotary generator with wire operation, similar end position sensors will be used to adapt the wire length also in such a case.

Figure 3:
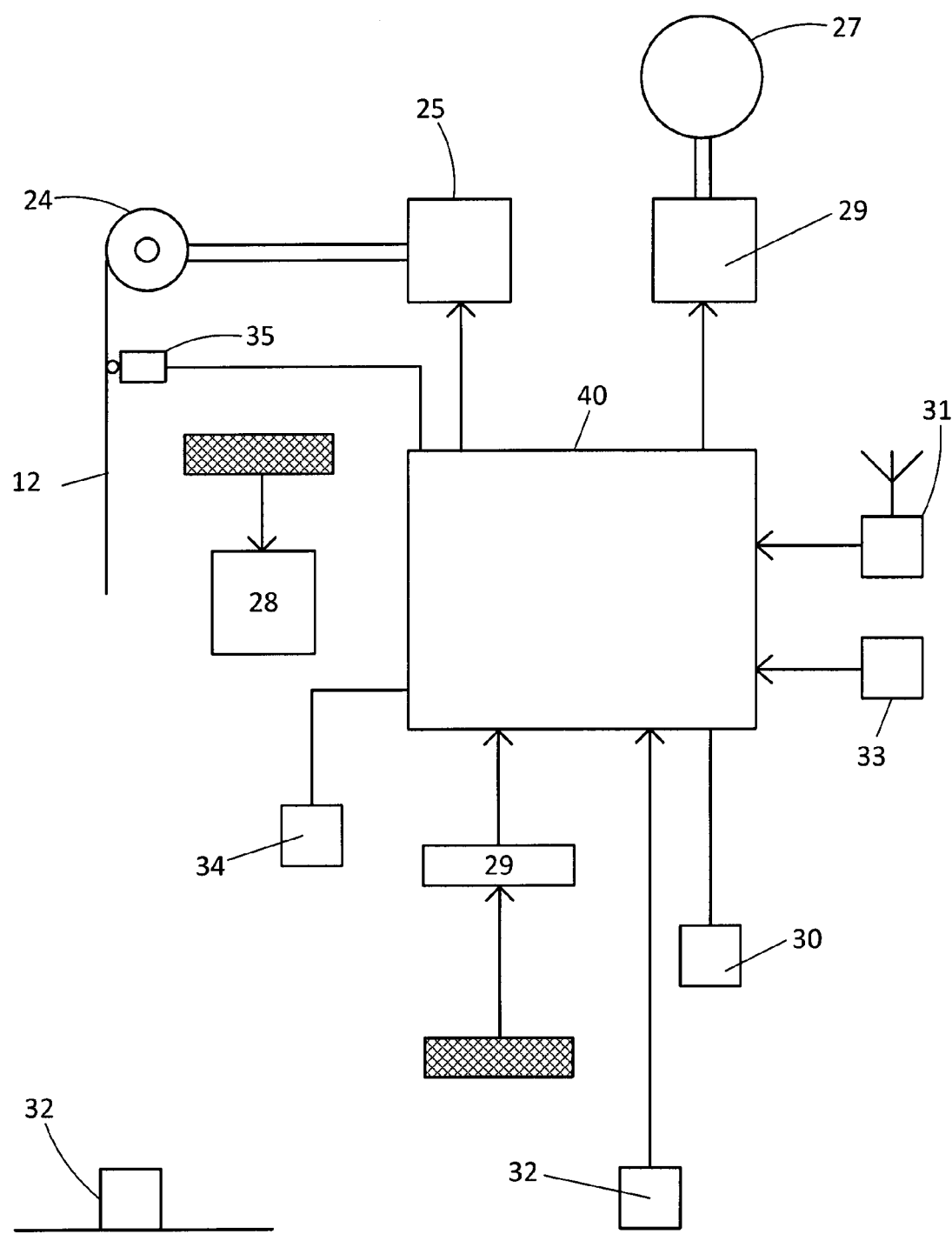
FIG. 3 is a schematic block diagram illustrating the controlling of the position of the buoyant body in the sea and for complete immersion of the buoyant body during storm.

FIG. 3 shows a block diagram illustrating the connection between the different parts of the control system for operation of the wave power converter unit.

Figure 4A:
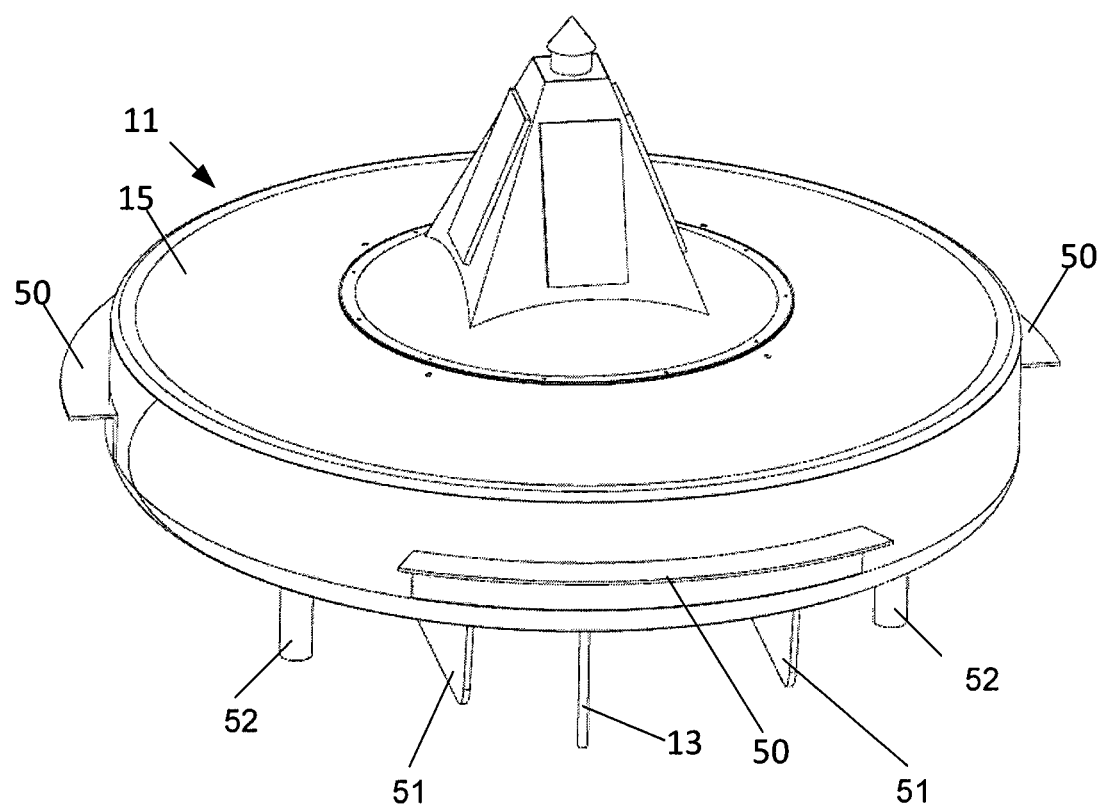
FIG. 4a-b shows an example of a buoyant body in accordance with a second embodiment of the invention.
Figure 4:
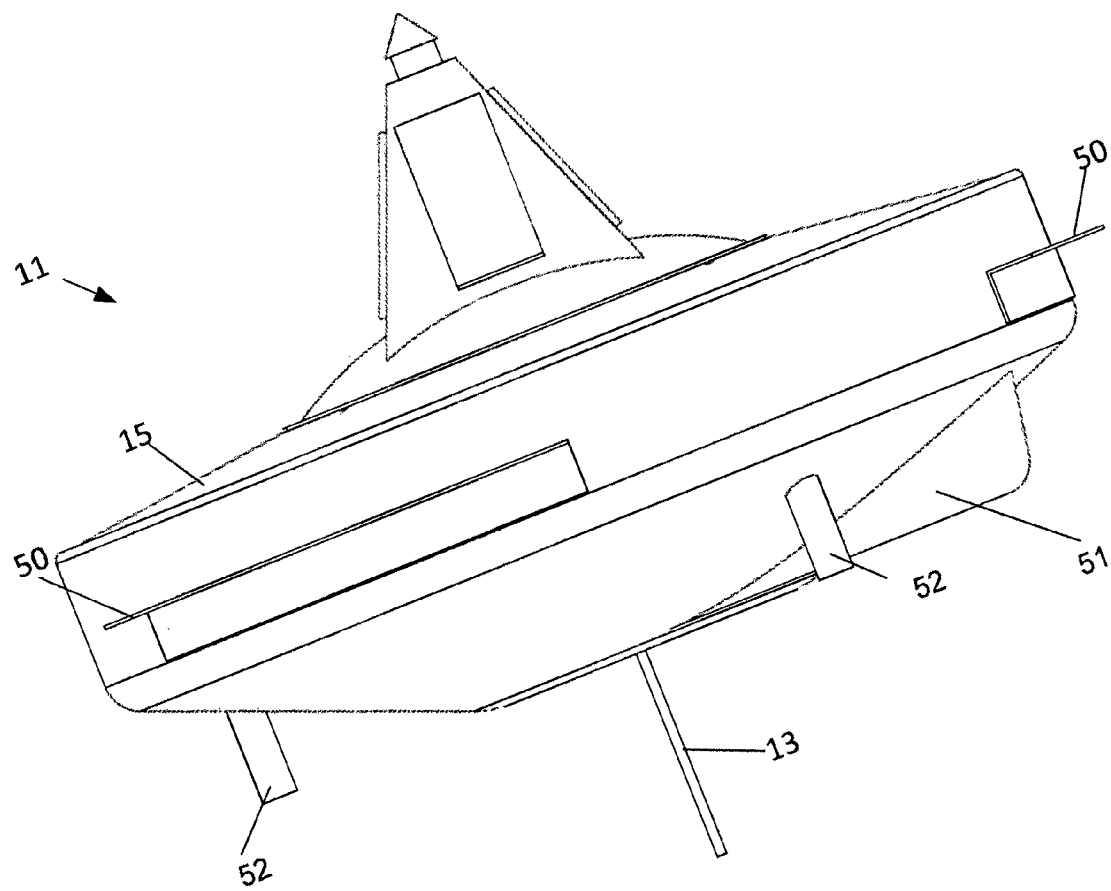

Reference is now made to FIGS. 4*a-b* which show a buoyant body according to a second embodiment of the invention, seen aslant from above and in a side view, respectively.

In accordance with the second embodiment the buoyant body 11 is provided with at least one wing 50. In the shown example there are three wings 50 evenly distributed around the circumference of the buoyant body 11, preferably with even distance between them. The wings 50 can be implemented in different ways:

rigidly mounted to an outer surface of the buoyant body 11,
movable and controllably arranged on the outer surface of the buoyant body,
arranged to be pulled into the internal part of the buoyant body 11 when the buoyant body 11 is positioned over water and which can be ejected when the buoyant body 11 is under water, said wings 50 also in this case preferably being controllably arranged.

For wings 50 being controllably arranged there will be a separate electric motor for each wing 50 in the buoyant body 11, said motors being controlled by the buoyant body 11 control unit 40 and provided with energy from batteries 38, 39. The control unit 40 is for this purpose provided with means and/or software for pulling in/ejecting the wings 50 and for controlling the same. In a most favorable embodiment the wings 50 are arranged to allow being guided in and out of the buoyant body 11 while also allow being controllable. In most cases it is favorable that the wings 50 can be held within the buoyant body 11 as long as the buoyant body 11 is at the surface of the sea 14, thereby avoiding driftwood or the like from damaging the wings 50.

Use of the wings 50 is described below.

Procedure for Immersion During Extreme Weather

The entire wave plant can be remotely monitored from a central onshore, offshore or the like. When critical weather conditions are forecasted, a message is sent via Internet or satellite to the local system network onshore or to a node in local network offshore.

Instruction of initiating "immersion procedure" is then sent to each local buoyant body 11 on a separate coded address via the UAC transducer 32 from the energy converter unit 12 at the bottom to the corresponding UAC transducer 32 on the buoyant body 11, or directly by use of the communication means 31.

The buoyant body 11 control unit 40 thus receives an instruction on how deep it shall be immersed and immediately starts opening the valve 30 at the bottom of the buoyant body 11, while continuously monitoring the exact number of liters entering by means of the measuring means 34. At the same time the stop valve 26 (possibly several), and dependent upon how deep the buoyant body 11 has been immersed, ensures that water is let in without overpressure.

In combination with the beginning intake of water into the buoyant body 11 the tensioning motor 25 starts to tension the wire 13. This is by means of the wire tension meter 35 at all times correlated with the maximum allowed wire tension to ensure that the wire is not over-tensioned.

If the wire tension meter 35 measures a higher tension than allowed in the wire 13, the tensioning is stopped and one awaits until the buoyant body 11 is further filled with so much water that the buoyant body may be pulled farther down without the wire 13 exceeding its critical value. When the buoyant body 11 has reached desired depth, the system is stabilized and all valves are shut. It is important that the buoyant body 11 does not take in more water than it still is maintaining some buoyancy—so that it at all times is suspended with a certain tension in the wheeled-in wire 13 and always will float back up when the wire 13 is slackened by the motor 25.

Combined with that the buoyant body 11 and the energy converter unit 12 in the power plant is remotely monitored and that the buoyant body 11 is remotely immersed when critical weather is forecasted, the buoyant body 11 itself will preferably monitor the weather, wave heights and wave frequency. Thus the buoyant bodies 11 can immerse themselves below the surface if necessary.

Measuring means 33 for movement and wind, abnormal wave heights from the surface meter 41 at the bottom and extreme measurements of tension variations in the wire 13 via the wire tensional meter 35 are examples of when the buoyant body 11 must dive. This automatically initiates immersion in the same manner as described above while also alerting the operating central of what is going on.

Monitoring and Activity in the Immersed Condition

When the buoyant body 11 is immersed it shall typically just be tightly suspended by the wire 13 and move as little as possible. Thus the means 33 for monitoring movement and means 35 for monitoring wire tension, monitor the buoyant body 11 movements and tension. If the buoyant body 11 still seems to be exposed to extreme forces, it is lowered further according to the procedure above. This can take place automatically and may be monitored from an operation central onshore.

Subsequent the buoyant body 11 being immersed to a "safe" depth the buoyant body 11 can utilize currents present to produce energy. The buoyant body 11 is in this case preferably provided with ballast so that it is in approximate balance. This is achieved by providing the buoyant body 11 with wings 50. By adjusting the angle of attack for the wings 50 the buoyant body 11 can be moved vertically up and down within a certain range, and thus perform energy creating movements by means of naturally occurring currents when the buoyant body 11 is positioned under water and not is influenced by wave movements.

The simplest way of conducting such control is by means of a ramp function which controls the angle of attack of the wings up and down at certain intervals. The wings 50 can operate in this manner until a defined lower level of battery capacity is reached if the buoyant body 11 is provided with energy from batteries. If the buoyant body 11 is provided with energy by a cable from the energy converter unit 12, the wings can operate independent of this.

Pulling wings 50 in and ejecting wings 50 out from the buoyant body 11 can be performed in many different ways. It is for instance contemplated that the water pressure created in the ballast tank 22 when the buoyant body 11 is lowered, can eject the wings 50 from the buoyant body 11 while an electric motor or the like can pull the wings 50 back in when the buoyant body 11 is elevated back up to the water surface and the pressure in the ballast tank 22 is reduced. It is also contemplated to make use some elastic device to perform these operations and also to use pressurized air from the compressor.

Elevation when Extreme Weather has Ceased

When the extreme weather is over the buoyant body 11 can—by command from a operation central—or automatically, rise to the surface again.

The weather improvement can be monitored via a central measurement point in the power plant combined with AST scanning and continuous meteorological information from shore.

Since the buoyant body 11 always exhibits positive buoyancy and never is filled with more water than that the tension in the wire is maintained, it is raised by allowing the winch 24 to gradually unwind the wire 13.

When the buoyant body 11 has reached the surface, the air compressor 27 starts to pump air into the ballast tank 22. When a certain overpressure has been reached, the bottom valve 30 is opened again so that the water is gradually forced out by the air pressure. When the ballast tank 22 is empty, the bottom valve 30 is again closed and the buoyant body 11 is back in normal operation. In the case in which the buoyant body 11 comprises wings 50, these are preferably pulled into the buoyant body 11 when this is in surface position.

The procedure of opening the bottom valves 30, letting in some water and "blowing the water out again" can be performed at certain intervals (e.g. once a week) automatically to prevent undesired growth of biological material in the bottom valve or the bottom valves 30 and their mechanics, if there are long periods without any immersion of the buoyant body 11 caused by storms.

Should the buoyant body 11 take in too much water so that the buoyant body 11 does not have buoyancy as it shall rise again, the buoyant body 11 is preferably provided with means for urgency elevation, such as a gas ampoule that manually or automatically can be activated or remotely activated from the central. In this way one is always guaranteed the ability to raise the buoyant body 11 if something unforeseeable should occur. In such a case it is also possible that the winch 24 is set in a position in which it rotates with a controllable brake force or freely. This gas ampoule can also be used if the compressor 27 does not work and the gas ampoule can then be used to serve the compressor function of removing water from the ballast tank.

Adaption to Waves

The mentioned ballast tank 22 and immersion-mechanics can also be used to continuously take ballast water into the buoyant body 11 for in that way to adapt to the local waves and wave characteristics. By optimized software and resonator algorithms, the buoyant body 11 can thus be made an "optimal resonator" in relation to the surroundings. The amplitudes at low waves can in that way be increased significantly and contribute to provide an improved operating economy for the wave power plant during normal operation periods.

This also implies that the buoyant body 11—by automatically filling the ballast tank 22 according to defined algorithms also can dampen the amplitudes (anti-resonate) at increasing wave-height when a storm is arriving—and thus holding the wave power plant in operation even if the wave height exceeds the normal stroke of the energy converter at the bottom. The ballast function of the buoyant body thus provides a possibility for holding the wave power plant in operation in more extreme weather than what the energy converter generally is designed for, and until the waves reach such extreme heights that the buoyant body 11 must be completely immersed under the surface according to the earlier described main function.

A condition for all controlling of the buoyant body 11 is that it ensures an optimal stroke for the energy converter 16.

It serves no purpose to optimize the behaviour of the buoyant body 11 in different wave conditions if not also the stroke of the energy converter 16 is taken into consideration. To achieve energy recovery as optimal as possible considerations must be made both to the stroke and to the wave conditions.

Energy Supply

The buoyant body receives energy for charging the batteries—which powers the air compressor 27, controls the valves 30, 28, the control unit 40, the tensioning motor 25, the wings 50, antenna 31, the measuring means 33-35, the UAC transducer 32 and optionally the wings 50 with accompanying mechanisms—from the water resistant solar panels 36, 37 which are mounted on top of the buoyant body 11. The batteries 38, 39 is continuously monitored locally or from a central location via UAC transducers 32 or the communication means 31 directly to a central onshore or via the energy converter unit 12.

Should the main battery be emptied due to many days of immersion caused by extreme weather for a long time, this does not constitute a problem since the buoyant body 11 always will have sufficient buoyancy and therefore automatically will float up to the surface once the wire 13 is unwound by the tensioning motor 25. The backup battery only has the purpose to keep the UAC communication alive by a frequent communication to a central with a rare frequency (e.g. every 20 minutes) and be able to trigger the tensioning motor 25 so that the buoyant body 11 automatically will rise to the surface when the tensioning motor 25 unwinds the wire 13. As mentioned above the buoyant body 11 preferably includes a gas ampoule which can be used, if for some reason, the buoyant body 11 lacks buoyancy, thereby ensuring that the buoyant body 11 always may be brought up to the surface.

Preferably the buoyant body 11 is assigned the tasks of checking status, performing measurements and communicating with the energy converter unit 12 and possibly another central at certain intervals to save power, e.g. every 10 minutes. The buoyant body 11 thus can be online in immersed condition for days if required and still have backup power to run the air compressor 27 immediately when the buoyant body 11 shall be returned to the surface so that the wave power converter immediately returns to normal power production and not has to stay long in order for the solar cell plant to charge sufficient energy to the batteries before the ballast tank can be emptied for water.

Modifications

The invention can be modified from this example. As mentioned other generators or pumps can be used to generate electric or hydraulic energy that can be transmitted to a central receiver.

The shown structure of the buoyant body or the "buoy" can be changed in different ways, a.o. to reduce wind resistance.

As a safety measure the buoyant body can be provided with a gas ampoule that ensures that the buoyant body can be returned to the surface independently of the air compressor by immediately removing water from the ballast tank.

Even though the shown example of the buoyant body exhibits three wings it is evident that the number of wings and the design of the wings can vary according to the desired properties for the buoyant body.

Means for acquiring information in connection with the buoyant body can also include means to detect objects moving towards the buoyant body, such as drift ice, vessels and the like, so that the buoyant body can dive to avoid damage or breakdown. This can for example be a simple form of laser radar.

As shown in FIGS. 4a-b the buoyant body can be provided with rudders 51 which may also be controllable.

As likewise shown in FIGS. 4a-b, the buoyant body can preferably be provided with feet 52 to prevent the buoyant body from being damaged during transportation.

The buoyant body can be provided with several ballast tanks if desired.

The invention claimed is:

1. A wave power plant comprising:
   at least one wave power converter comprising at least one buoyant body,
   an energy converter unit,
   a wire,
   a motor,
   a valve, and
   a compressor,
   wherein said energy converter unit includes a mechanical-electric, mechanical-hydraulic, or piezo-electric energy converter, and is arranged in the sea, or on the seafloor, under the buoyant body, wherein said buoyant body and mechanical-electric, mechanical-hydraulic, or piezo-electric energy converter is connected by the a wire fixed at one end to the mechanical-electric, mechanical-hydraulic, or piezo-electric energy converter, and arranged to the buoyant body at the other end by a winch powered by the motor arranged in the buoyant body, and wherein said buoyant body comprises at least one ballast tank for controlling the buoyancy of the buoyant body, wherein the ballast tank comprises a bottom valve for supply and discharge of water,
   the buoyant body further comprising a ventilation pipe arranged to the ballast tank via the valve and the compressor arranged to the ballast tank via the valve for supply and discharge of air,
   the buoyant body and the energy converter unit are provided with a UAC transducer,
   the buoyant body is provided with a wire tension meter or Kilo Pound meter to measure the wire tension, and a laser meter or float to measure the filling level or pressure in the ballast tank,
   the energy converter unit is provided with a pair of end position sensors to measure a stroke of the mechanical-electric, mechanical-hydraulic, or piezo-electric energy converter.

2. The wave power plant according to claim 1, wherein the buoyant body is provided with a compressor connected to one or several valves and at least one bottom valve.

3. The wave power plant according to claim 2, comprising unidirectional air valves at the top of, and at the side of, the ballast tank.

4. The wave power plant according to claim 1, wherein the buoyant body is provided with energy supply in the form of one or more of:
   a solar cell plant including at least one solar cell and at least one battery,
   a mini wave generator arranged in connection with the buoyant body,
   a separate cable down to the energy converter unit at the bottom,
   a mini generator connected to the motor, and
   a mini windmills arranged to the buoyant body.

5. The wave power plant according to claim 1, wherein the at least one ballast tank is integrated in a lower part of the buoyant body.

6. The wave power plant according to claim 1, wherein the energy converter unit includes a surface measuring meter.

7. The wave power plant according to claim 1, wherein the buoyant body is provided with an antenna.

* * * * *